US010760308B2

(12) United States Patent
Aravkin et al.

(10) Patent No.: US 10,760,308 B2
(45) **Date of Patent: *Sep. 1, 2020**

(54) AUTOMATIC CAR DOOR SWING LIMITER

(71) Applicant: International Business Machines Corporation, Armonk, NY (US)

(72) Inventors: Aleksandr Y. Aravkin, Seattle, WA (US); Guy Cohen, Ossining, NY (US); Lior Horesh, North Salem, NY (US); Raya Horesh, North Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/723,425

(22) Filed: Oct. 3, 2017

(65) Prior Publication Data

US 2019/0100949 A1 Apr. 4, 2019

(51) Int. Cl.

| | |
|---|---|
| ***B60Q 1/00*** | (2006.01) |
| ***E05C 17/00*** | (2006.01) |
| ***G08G 1/16*** | (2006.01) |
| *E05F 15/42* | (2015.01) |
| *E05F 15/40* | (2015.01) |

(52) U.S. Cl.

CPC ........... *E05C 17/006* (2013.01); *G08G 1/166* (2013.01); *G08G 1/168* (2013.01); *E05F 15/40* (2015.01); *E05F 2015/483* (2015.01); *E05Y 2400/32* (2013.01); *E05Y 2400/44* (2013.01); *E05Y 2900/531* (2013.01)

(58) Field of Classification Search

CPC . B60W 30/0953; E05C 17/006; B60Q 1/0023

USPC ............... 340/426.28, 436, 435; 701/49, 301

See application file for complete search history.

(56) References Cited

U.S. PATENT DOCUMENTS

| | | | |
|---|---|---|---|
| 7,761,209 | B2 | 7/2010 | Morris et al. |
| 2005/0085972 | A1 | 4/2005 | Martinez |
| 2005/0280284 | A1 | 12/2005 | McLain et al. |

(Continued)

FOREIGN PATENT DOCUMENTS

| | | | |
|---|---|---|---|
| DE | 19947203A1 | A1 | 4/2001 |

OTHER PUBLICATIONS

List of IBM Patents or Patent Applications Treated as Related, dated Nov. 28, 2017, pp. 2.

(Continued)

*Primary Examiner* — Munear T Akki

(74) *Attorney, Agent, or Firm* — Scully, Scott, Murphy & Presser, PC; Daniel P. Morris, Esq.

(57) ABSTRACT

A computer implemented method and computer system for automatically limiting the swing angle of a vehicle door to not hit nearby moving objects, including predicting that a moving object will move to be within a predetermined distance of the door and predicting the distance the moving object will be from the door, determining a swing angle extent of an opening of the door that will avoid hitting the moving object and actuating a door controller to limit the swing angle of the door. Historical data on the speed the door is opened can be used in determining the door swing angle. The current position and velocity of the moving object relative to the door of the vehicle is estimated based on signals received from sensors attached to the vehicle.

13 Claims, 4 Drawing Sheets

(56) References Cited

U.S. PATENT DOCUMENTS

| | | | | |
|---|---|---|---|---|
| 2007/0188312 | A1* | 8/2007 | Bihler | B60R 21/0134 340/435 |
| 2009/0000196 | A1 | 1/2009 | Kollar et al. | |
| 2010/0076651 | A1* | 3/2010 | Nakakura | G01S 7/4811 701/49 |
| 2011/0196568 | A1* | 8/2011 | Nickolaou | B60W 30/0953 701/31.4 |
| 2012/0065858 | A1* | 3/2012 | Nickolaou | B60Q 9/008 701/70 |
| 2013/0144495 | A1 | 6/2013 | Yu | |
| 2013/0154792 | A1 | 6/2013 | Reed et al. | |
| 2013/0234844 | A1* | 9/2013 | Yopp | B60Q 9/008 340/435 |
| 2014/0297173 | A1* | 10/2014 | Li | G08G 1/056 701/301 |

OTHER PUBLICATIONS

J. Maas et al, "Mechatronic Vehicle Door Assistant", 2007 IEEE/ASME International Conference On Advanced Intelligent Mechatronics, 2007, pp. 1-5.

Jesse Bowers, Just a Car Guy, Sep. 28, 2013, blog, pp. 1-2 http://beforeitsnews.com/motor-junkies/2013/10/a-door-prop-rod-thatlimits-the-swing-so-your-doors-are-open-but-not-going-to-hit-the-nearby-cars-great-idea-2-2478532.html.

Official Action dated Oct. 26, 2018 in a related application, namely, U.S. Appl. No. 15/824,449 dated Nov. 28, 2017.

* cited by examiner

AUTOMATIC CAR DOOR SWING LIMITER

BACKGROUND OF THE INVENTION

This disclosure is directed to computers, and computer applications, and more particularly to computer-implemented methods and systems for automatically controlling the opening of a door of a vehicle, and more particularly, for automatically limiting the swing angle of the car's door, such that it will not hit nearby moving objects.

A common accident occurs when one car is parked in a parking lot and the driver opens his door when another car is in the process of parking in the spot next to the already parked car, resulting in the moving car hitting the opening door of the parked car. As a result, competing insurance claims are made by each driver against the other's liability coverage. The insurance companies involved investigate and determine where fault lies and settle the claims. In most cases the party opening the door would be the one to bear the majority of fault. The insurance companies usually decide that the person pulling into the parking spot can't be sure when a person is going to open their door, while the driver of the parked car should be aware enough of his surroundings to check for an incoming car before opening the door. In addition, many state vehicle traffic laws basically state that no person shall open the door of a vehicle on the side available to moving traffic unless it is reasonably safe to do so.

Another example is when a moving car or biker is coming towards a car parked on a city street. The driver opening the door does not to see the approaching car or biker and may open the door into the moving car or biker, causing damage or injury.

There is a need for a system to automatically limit the swing angle of a car door, such that it will not hit nearby moving or stationary objects.

SUMMARY OF THE INVENTION

In one embodiment, a computer implemented method for controlling the opening of a door of a vehicle includes predicting that a moving object will move to be within a predetermined distance of the door of the vehicle at a future point in time and predicting the distance the moving object will be from the door of the vehicle at that future point in time. The method includes determining a swing angle extent of an opening of the door at the future point in time that will avoid hitting the moving object based in part on the predicted distance and actuating a door controller prior to that future point in time to limit the swing angle of the door to the determined extent.

In one embodiment, the method includes accessing historical data on the speed the door is opened and determining a swing angle extent of an opening of the door at that future point in time that will avoid hitting the moving object based in part on the historical door opening speed data.

In one embodiment, the method includes estimating current position and velocity of the moving object relative to the door of the vehicle based in part on signals received from at least one sensor attached to the vehicle. The at least one sensor may be selected from the group consisting of distance, proximity, movement and pressure sensors.

A system that includes one or more processors operable to perform one or more methods described herein also may be provided.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION OF PREFERRED EMBODIMENTS

A method and system to automatically limit the swing angle of a car door, such that it will not hit nearby moving or stationary objects is disclosed. In one embodiment, the system includes one or more sensors, a computational module for determining to what extent an opening door will avoid hitting an object and a door control actuator that limits the swing angle of the door in order to avoid damage. In one embodiment, the invention includes one or more of distance, proximity, motion and pressure sensors installed on the exterior part of the car door and the car body. The computational module includes predicting that a moving object will move to be within a predetermined distance of the door of the vehicle at a future point in time and predicting if the currently moving objects will be in front of door when it is opened. The computational module determines a swing angle extent of an opening of the door at that future point in time that will avoid hitting the moving object based in part on the predicted distance and actuates a door controller prior to that future point in time to limit the swing angle of the door to the determined extent.

The car sensors monitor the surrounding area for moving objects and the computational module predicts whether any of these moving objects will interfere with the door opening as a function of time. In one embodiment, the computational module will employ cognitive algorithms to identify moving objects in the surrounding area and categorize their predicted behavior. The behavior can include assignment of error margins based upon the object's characteristics. For example, a child running would be less predictable than a driving car. The computational module determines whether and to what extent a door can be opened in a given time. In one embodiment, the system and method can also have different behavior depending on the driver or situation, for example, the door can open more slowly when driver is threatened by moving traffic.

The system and method disclosed herein provides adaptive adjustment to limit the door swing angle based on the current condition, without a-priori affixing it to a specific level. This solution will greatly reduce the amount of damage and injuries caused by car door opening accidents, as well as significantly reducing the number of insurance claim payouts, thereby resulting in an overall reduction in insurance premiums.

In one embodiment, the system senses the moving object before the door is opened. In one embodiment, the system is actuated as soon as the inside door handle is touched or unlatched. In one embodiment, the system is activated whenever the car motor is turned off or in idle. In one embodiment, initially a warning is activated and if the handle is touched, the door limiter is activated.

Figure 1:
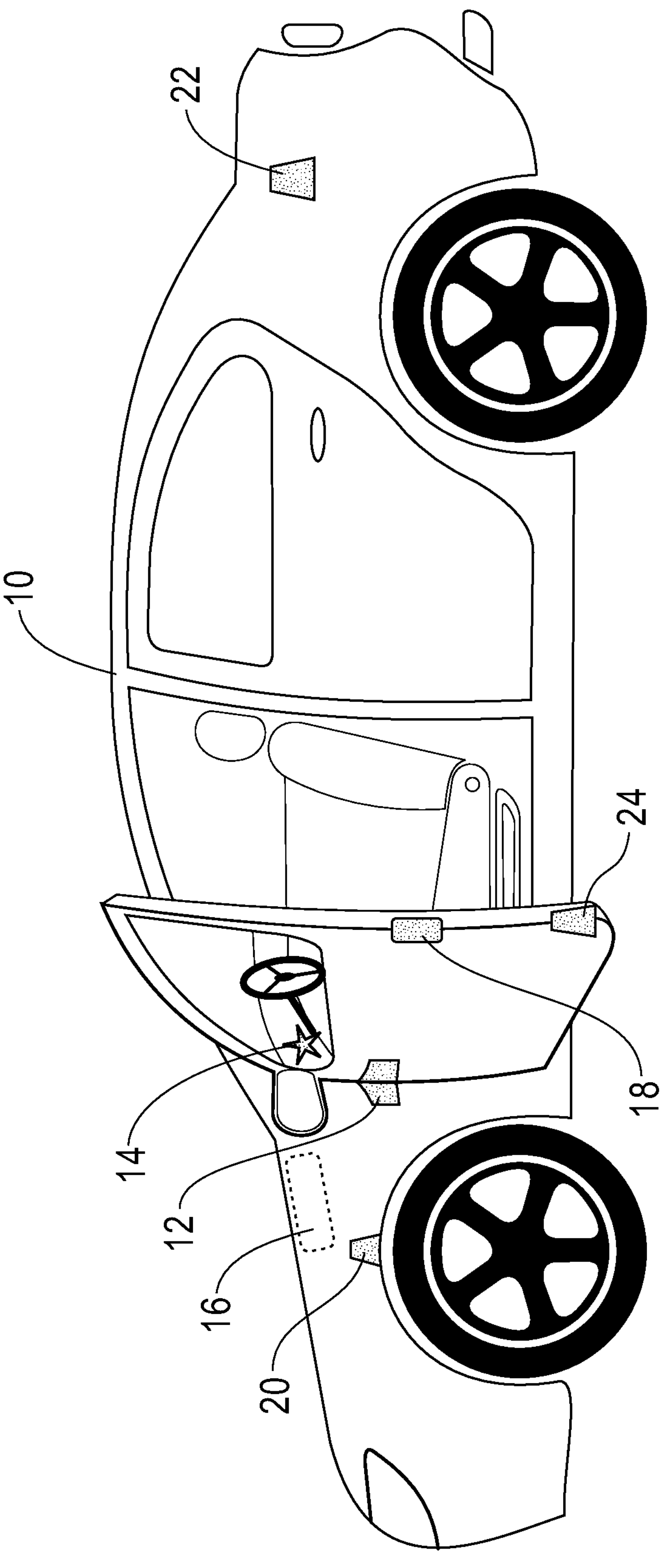
FIG. 1 is a schematic diagram of one embodiment of the system disclosed in this specification.

FIG. 1 is a schematic depiction of one embodiment of the system for automatically limiting the swing angle of a car door, such that it will not hit nearby moving or stationary objects. Vehicle 10 includes door limit actuator 12, notification module 14, computational module 16, distance sensor 18, proximity/motion sensors 20, 22, pressure sensor 24. The distance sensor 18 detects the distance from the door to adjacent objects and the proximity/motion sensors 20 and 22 detect the presence of a moving object. FIG. 1 shows a single, distance sensor 18, as well as single proximity/motion sensors 20, 22, and a single pressure sensor 24. However, in many cases more than one of these sensors will be required. For example, to better detect pressure a plurality of pressure sensors will be mounted or embedded in the door. Furthermore, while FIG. 1 shows the sensors for the driver's door, these sensors will be mounted also on the passengers' doors.

The computational module 16, based on the signals from one or more of the sensors 18, 20 22 and 24, predicts that a moving object will move to be within a predetermined distance of the door of the vehicle at a future point in time, predicts the distance the moving object will be from the door of the vehicle at the future point in time and determines a swing angle extent of an opening of the door at that future point in time that will avoid hitting the moving object determine a swing angle extent of an opening of the door at that future point in time that will avoid hitting the moving object based in part on the predicted distance. The computational module 16 then sends signal to the door limiter/actuator 12 to actuate the door limiter prior to that future point in time to limit the swing angle of the door to the determined extent. The computational module 16 also sends a signal to notification module 14 to alert the driver that the door opening will be limited. In one embodiment, as the door is opening, the moving object data keeps streaming from the sensors and the computational module 16 recalculates the swing appropriate based on the door opening speed. The computation is a continuous process while the door is being opened.

Figure 2:
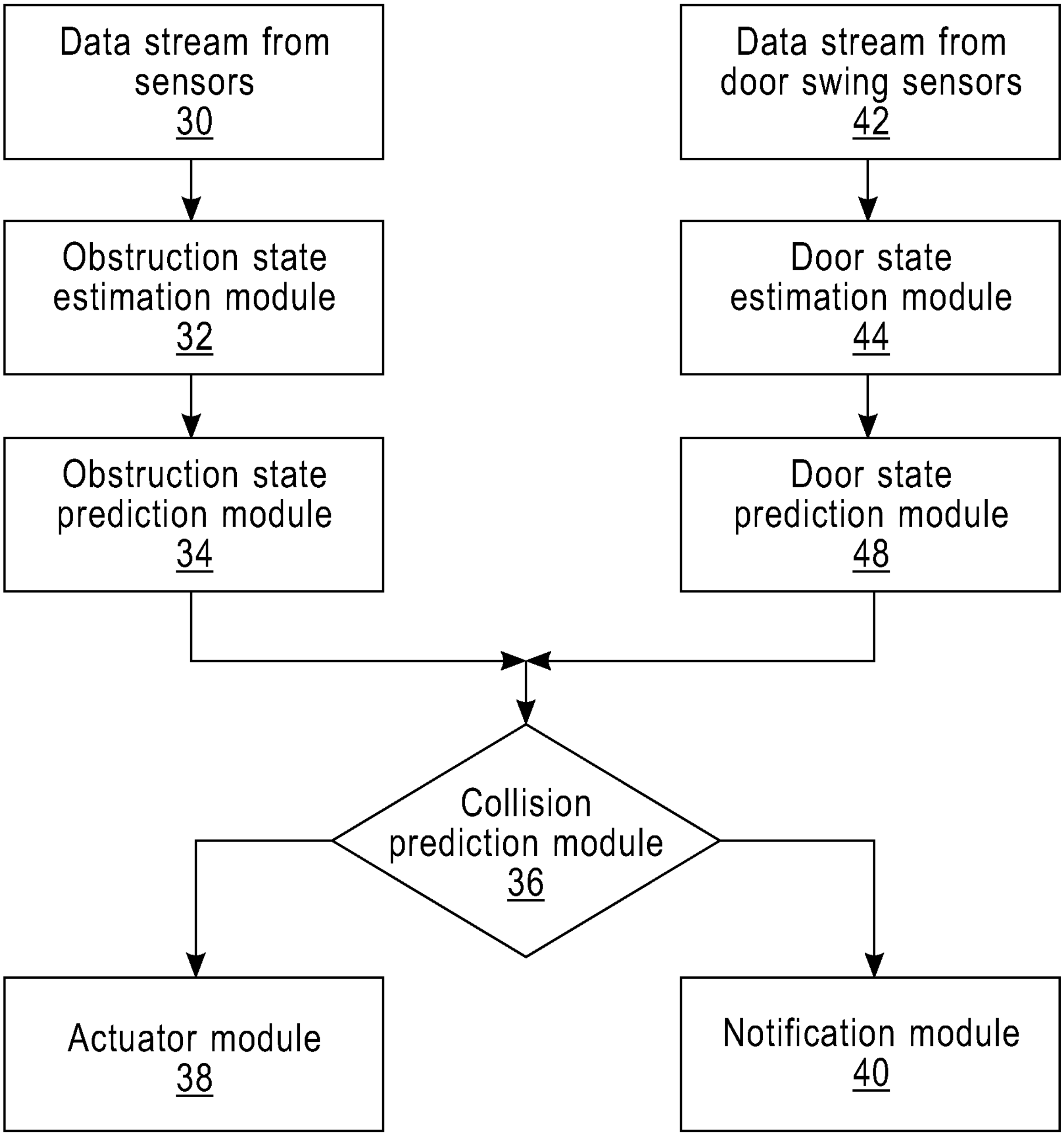
FIG. 2 is a block diagram of one embodiment of the system disclosed in this specification.

FIG. 2 is a block diagram of one embodiment of a computer system for automatically limiting the swing angle of a car door, such that it will not hit nearby moving objects. Data stream module 30 obtains raw data from distance, pressure and proximity/motion sensors attached to the parked vehicle and generates a data stream in a format usable by the computer system. The data stream is input to an obstruction state estimation module 32, which estimates a current position and velocity of a moving object. The estimated current position and velocity of the moving object is input to an obstruction state prediction module 34, which predicts an obstruction trajectory of the moving object. Collision prediction module 36 analyzes the current obstruction state and the obstruction state prediction and determines the bounds for the door swing angle that will avoid the car door hitting the moving obstruction. Actuator module 38 actuates a door limiter device to increase resistance the opening of the door based on the determined door swing angle. Actuator module may alternatively or in addition, stop door movement in proportion to proximity of the moving object to the door. Notification module 40 notifies the user of the door opening resistance or of the stop door opening actuation.

In an optional embodiment, data stream 42 obtains raw data from door swing sensors and generates a data stream in a format usable by the computer system. Door state estimation module 44 estimates a current position and velocity of the door in the process of being opened. Door state prediction module predicts door opening trajectory based on the estimated current position and velocity of the opening door. Collision prediction module 36 analyzes the door state estimation and the door state prediction in addition to the current obstruction state and the obstruction state prediction and determines the bounds for the door swing angle that will avoid the car door hitting the moving obstruction.

In one embodiment, the system also can prevent an opening door from hitting a stationary object. Obstruction state estimation module 32 estimates the proximity of the door to the stationary obstruction. If proximity is smaller than a predefined value, the actuator module actuates the door limiter to increase resistance or stop door movement and the user is notified.

Figure 3:
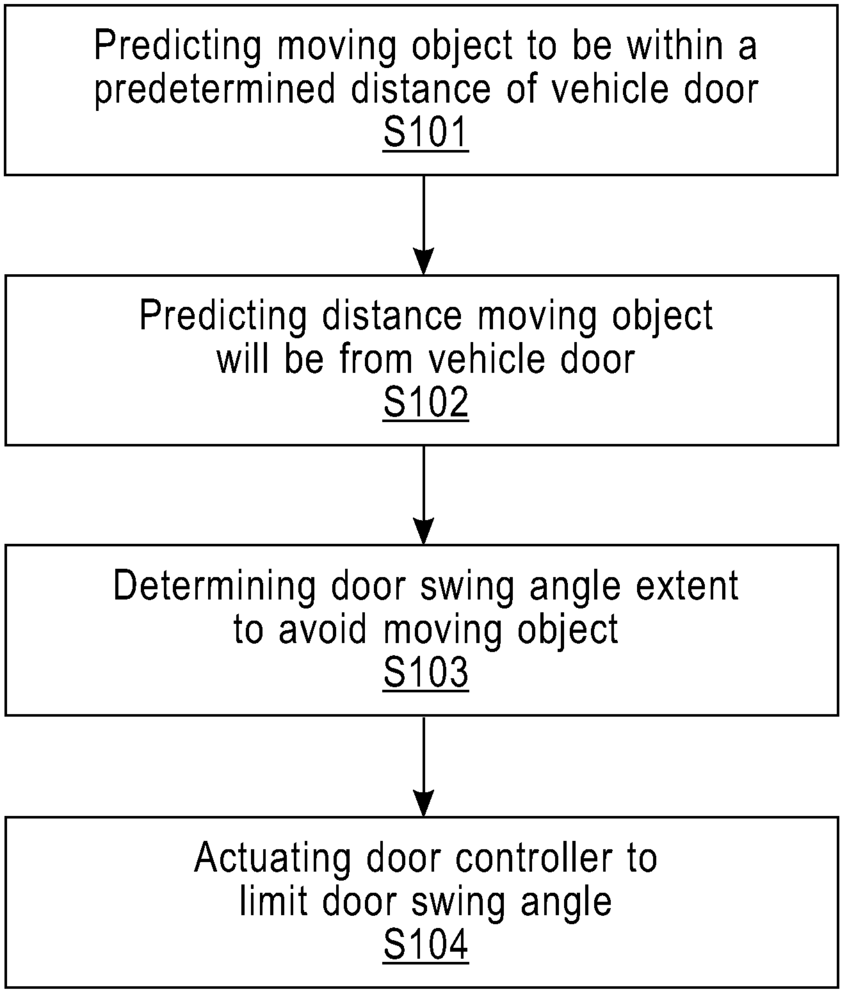
FIG. 3 is a flow diagram of one embodiment of the method disclosed in this specification.

FIG. 3 is a flow diagram of one embodiment of a computer implemented method for controlling the opening of a door of a vehicle. Step S101 includes predicting that a moving object will move to be within a predetermined distance of the door of the vehicle at a future point in time. Step S102 includes predicting the distance the moving object will be from the door of the vehicle at that future point in time. Step S103 includes determining a swing angle extent of an opening of the door at the future point in time that will avoid hitting the moving object based in part on the predicted distance. Step S104 includes actuating a door controller prior to that future point in time to limit the swing angle of the door to the determined extent. Step S105 includes activating a warning signal in response to the actuation of the door controller.

In one optional embodiment, step S104 includes continuously predicting, as the door is opening, that a moving object will move to be within a predetermined distance of the door of the vehicle and the distance the moving object will be from the door of the vehicle; and continuously determining, as the door is opening, a swing angle extent of an opening of the door that will avoid hitting the moving object based in part on the predicted distance.

In one embodiment, steps S101 and S102 both include estimating current position and velocity of the moving object relative to the door of the vehicle. In one embodiment, estimating the current position and velocity of the moving object relative to the door of the vehicle is based in part on signals received from at least one sensor attached to the vehicle.

In one embodiment, step S104 includes actuating the door controller prior to that future point in time to increase resistance to an opening movement of the door. In another embodiment, step S104 includes actuating the door controller prior to that future point in time to stop the opening movement of the door.

Figure 4:
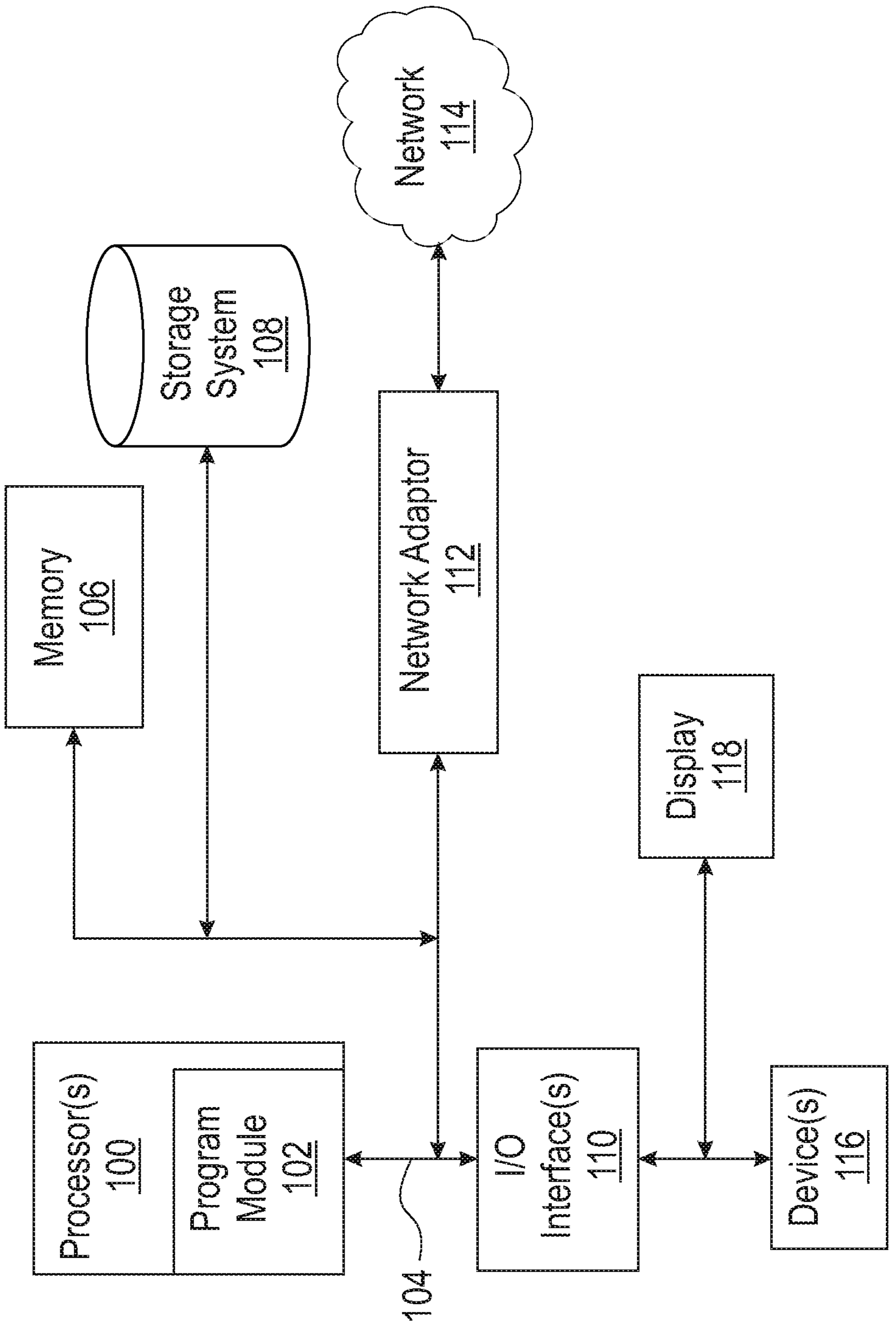
FIG. 4 is a block diagram of an exemplary computing system suitable for implementation of the embodiments disclosed in this specification.

FIG. 4 illustrates a schematic of an example computer or processing system that may implement the method for automatically limiting the swing angle of a car door, such that it will not hit nearby moving objects in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A computer system for controlling the opening of a door of a vehicle, the door having a first swing angle extent equal to the door being fully opened, comprising:

one or more computer processors;

one or more non-transitory computer-readable storage media;

program instructions, stored on the one or more non-transitory computer-readable storage media, which when implemented by the one or more processors, cause the computer system to:

predict a first distance a moving object will be from the door of the vehicle at a first point in time;

determine a first swing angle extent of an opening of the door that will avoid hitting the moving object at the first point in time based in part on the first predicted distance;

actuate a door controller prior to the first point in time to limit a swing angle of the door to the determined first swing angle extent when the door is opened;

predict, after the door controller is actuated and as the door is opening, a second distance the moving object will be from the door of the vehicle at a second point in time after the door has opened, the second distance being less than the first distance;

determine, as the door is opening, a second swing angle extent of the opening of the door that will avoid hitting the moving object at the second point in time based in part on the predicted second distance, the second swing angle extent being less than the first swing angle extent; and actuate the door controller prior to the second point in time to limit athe swing angle of the door to the determined second swing angle extent after the door has opened.

2. The computer system of claim 1, wherein the program instructions further cause the computer system to activate a warning signal in response to the actuation of the door controller.

3. The computer system of claim 1, wherein the program instructions to predict that the moving object will move to be within the predetermined distance of the door of the vehicle at the first point in time includes program instructions to estimate current position and velocity of the moving object relative to the door of the vehicle.

4. The computer system of claim 3, wherein the estimate of the current position and velocity of the moving object is based in part on signals received from at least one sensor attached to the vehicle.

5. The computer system of claim 4, wherein the at least one sensor is selected from the group consisting of distance, proximity, motion and pressure sensors.

6. The computer system of claim 1, wherein the program instructions further cause the computer system to actuate the door controller prior to that first point in time to increase resistance to an opening movement of the door.

7. The computer system of claim 1, wherein the program instructions further cause the computer system to actuate the door controller prior to that first point in time to stop the opening movement of the door.

8. A computer program product comprising:

program instructions on a computer-readable storage medium for controlling the opening of a door of a vehicle, the door having a first swing angle extent equal to the door being fully opened, where execution of the program instructions using a computer causes the computer to:

predict a first distance a moving object will be from the door of the vehicle at the first point in time;

determine a first swing angle extent of an opening of the door that will avoid hitting the moving object at the first point in time based in part on the first predicted distance;

actuate a door controller prior to the first point in time to limit the swing angle of the door to the determined second swing angle extent when the door is opened;

predict, after the door controller is actuated and as the door is opening, a second distance the moving object will be from the door of the vehicle at a second point in time after the door has opened, the second distance being less than the first distance;

determine, as the door is opening, a second swing angle extent of the opening of the door that will avoid hitting the moving object at the second point in time based in part on the predicted second distance, the second swing angle extent being less than the first swing angle extent; and actuate the door controller prior to the second point in time to limit the swing angle of the door to the determined second swing angle extent after the door has opened.

9. The computer program product of claim 8, wherein the program instructions further cause the computer to estimate of the current position and velocity of the moving object based in part on signals received from at least one sensor attached to the vehicle.

10. The computer program product of claim 8, wherein the program instructions further cause the computer to actuate the door controller prior to that first point in time to increase resistance to an opening movement of the door.

11. The computer program product of claim 8, wherein the program instructions further cause the computer to actuate the door controller prior to that first point in time to stop the opening movement of the door.

12. The computer system of claim 1, wherein the second distance and the second swing angle extent are based on the door opening speed.

13. The computer program product of claim 8, wherein the second distance and the second swing angle extent are based on the door opening speed.

* * * * *